United States Patent
McNamee et al.

(10) Patent No.: US 11,726,611 B2
(45) Date of Patent: Aug. 15, 2023

(54) METHOD AND CONTROL UNIT FOR GENERATING A CONTROL COMMAND TO AT LEAST ONE ACTUATOR OF AN ELECTROHYDRAULIC MACHINE

(71) Applicant: Caterpillar Inc., Peoria, IL (US)

(72) Inventors: Niall Hugh McNamee, Thorpe Astley (GB); Fuaad Sayeed, Dunlap, IL (US); Paul John Cairns, Groby (GB); Arick M. Bakken, Desford (GB)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/203,922

(22) Filed: Mar. 17, 2021

(65) Prior Publication Data
US 2021/0311584 A1 Oct. 7, 2021

(30) Foreign Application Priority Data
Apr. 2, 2020 (GB) ...................................... 2004867

(51) Int. Cl.
*G06F 3/041* (2006.01)
*B60G 11/00* (2006.01)
*B60G 17/00* (2006.01)

(52) U.S. Cl.
CPC ............ *G06F 3/0418* (2013.01); *B60G 11/00* (2013.01); *B60G 17/00* (2013.01); *B60G 2206/00* (2013.01)

(58) Field of Classification Search
CPC ........ G06F 3/0418; B60G 11/00; B60G 17/00
USPC ................................ 345/173–174
See application file for complete search history.

(56) References Cited

U.S. PATENT DOCUMENTS

| | | |
|---|---|---|
| 5,622,226 A | 4/1997 | Hausman et al. |
| 6,895,319 B2 | 5/2005 | Alexander et al. |
| 6,941,687 B2 | 9/2005 | Sharkness et al. |
| 7,114,747 B2 | 10/2006 | Dix et al. |
| 8,352,129 B2 | 1/2013 | Yuan et al. |
| 9,476,180 B2 | 10/2016 | Takaura |
| 2003/0112219 A1 | 6/2003 | Gharsalli et al. |
| 2003/0125859 A1* | 7/2003 | Dix ..................... B60G 17/056 701/50 |
| 2012/0089419 A1* | 4/2012 | Uster .................. A61G 7/0527 705/3 |
| 2012/0200514 A1* | 8/2012 | Allen ..................... G16H 40/63 345/173 |

(Continued)

FOREIGN PATENT DOCUMENTS

| | | |
|---|---|---|
| DE | 102007021499 A1 | 11/2008 |
| JP | 2003221843 A | 8/2003 |

(Continued)

OTHER PUBLICATIONS

Great Britain Search Report related to Application No. 2004867.4; reported dated Sep. 29, 2020.

*Primary Examiner* — Kwin Xie (57) ABSTRACT

The present invention refers to a method for generating a control command to at least one actuator of an electrohydraulic machine, comprising a step of receiving and monitoring an input signal provided by a user interface, a step of determining if the monitored input signal is related to a user-induced input or a non-user-induced input, and a step of generating the control command upon processing the input signal in dependence on whether the input signal is a user-induced input or a non-user-induced input.

18 Claims, 6 Drawing Sheets

(56) References Cited

U.S. PATENT DOCUMENTS

| | | | | |
|---|---|---|---|---|
| 2014/0310412 A1* | 10/2014 | Shinohara | ......... | G06Q 10/0833 |
| | | | | 709/224 |
| 2017/0089041 A1* | 3/2017 | Kawamoto | ............ | E02F 9/265 |
| 2019/0041894 A1* | 2/2019 | Parazynski | .............. | G05G 1/04 |
| 2019/0338809 A1* | 11/2019 | Clark | .................. | A01B 69/001 |
| 2019/0359257 A1 | 11/2019 | Johnson et al. | | |
| 2020/0131741 A1* | 4/2020 | Lehmann | ................ | E02F 9/264 |

FOREIGN PATENT DOCUMENTS

| JP | 2006027394 A | 2/2006 |
|---|---|---|
| JP | 2007128243 A | 5/2007 |
| JP | 2008174986 A | 7/2008 |
| JP | 4558396 B2 | 10/2010 |
| JP | 2010250459 A | 11/2010 |
| JP | 4685594 B2 | 5/2011 |

\* cited by examiner

METHOD AND CONTROL UNIT FOR GENERATING A CONTROL COMMAND TO AT LEAST ONE ACTUATOR OF AN ELECTROHYDRAULIC MACHINE

CROSS-REFERENCE TO RELATED APPLICATION

This application claims priority under 35 USC § 119 and the Paris Convention to Great Britain Patent Application 2004867A filed on Apr. 2, 2020.

TECHNICAL FIELD

The present invention refers to a method and a control unit for generating a control command to at least one actuator of an electrohydraulic machine.

TECHNOLOGICAL BACKGROUND

Many machines use hydraulic actuators to accomplish a variety of tasks, such as moving a working tool or an implement. Examples of such machines include, without limitation, dozers, loaders, excavators, motor graders, and other types of heavy machinery. The hydraulic actuators in such machines are linked via fluid flow lines to a pump associated with the machine to provide pressurized fluid to the hydraulic actuators.

With the advent of electro-hydraulics, it has become possible to control the hydraulic actuators and work tools in many ways. For example, computer-based controllers can be programmed to operate electro-hydraulic valves and solenoids with great precision, thus alleviating many of the difficult, tedious, tiring, or time-consuming tasks that operators previously had to perform.

On electrohydraulic machines the input of an operator is typically provided by a user interface, e.g. an input device such as a joystick, transmitting a signal which is read into an electronic machine controller which processes the signal and generates a control command to an electrohydraulic implement valve to activate the actuators. Accordingly, when the joystick is moved by the operator it operates an implement function.

The joystick can be spring-loaded towards a neutral position (e.g. center position) such that the operator moves the joystick against the bias in order to operate the implement function and the joystick returns to its neutral position once it is released by the spring.

For ensuring safe operation of the electro-hydraulic machine and increasing the efficiency of the operation, the control commands triggered by the input device to the actuators need however be monitored and eventually adapted. For example, control commands which were triggered by the movement of the input device by the operator inadvertently, e.g. by bumps in the driving surface which transfer to the joystick or other circumstances which may cause unintended inputs, may be damped.

U.S. Pat. No. 7,114,747B2 describes a controller which comprises a flow rate damping or ramping feature that prevents abrupt motion of a joystick.

Prior art methods for controlling the control commands may still be improved by providing more sophisticated or improved control mechanisms.

SUMMARY OF THE INVENTION

Starting from the prior art, it is an objective to provide an improved method and an improved control unit for generating a control command to at least one actuator of an electrohydraulic machine, which particularly contributes to an improved detection of non-user induced inputs.

This objective is solved by a method and a control unit for generating a control command to at least one actuator of an electrohydraulic machine with the features of claim 1 and claim 15 respectively. Preferred embodiments are set forth in the present specification, the Figures as well as the dependent claims.

Accordingly, a method for generating a control command to at least one actuator of an electrohydraulic machine is provided. The method comprises a step of receiving and monitoring an input signal provided by a user interface and a step of determining if the monitored input signal is related to a user-induced input or a non-user-induced input and a step of generating the control command upon processing the input signal in dependence on whether the input signal is a user-induced input or a non-user-induced input.

Furthermore, a control unit for use in an electrohydraulic machine system for a user interface of an electrohydraulic machine is provided. The control unit comprises a monitoring unit configured for receiving and monitoring an input signal of the user interface, and a determination unit configured for determining if the monitored input signal is related to a user-induced input or a non-user induced input, and a control command generating unit for generating a control command to an actuator upon processing the input signal in dependence on whether the input signal is a user-induced input or a non-user-induced input.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

In the following, the invention will be explained in more detail with reference to the accompanying figures. In the Figures, like elements are denoted by identical reference numerals and repeated description thereof may be omitted in order to avoid redundancies.

Figure 1:
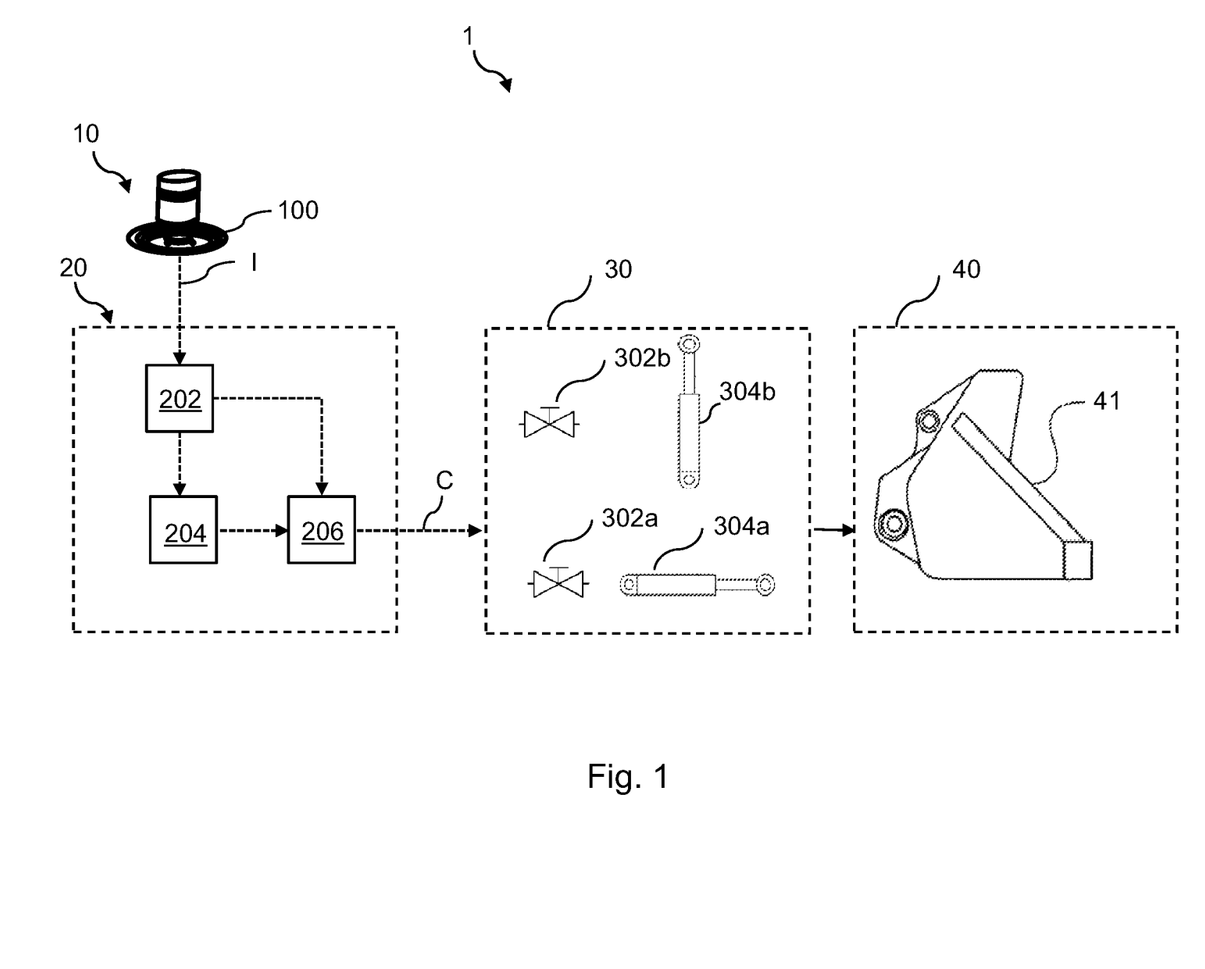
FIG. 1 schematically shows a block diagram of an electrohydraulic machine with a control unit for generating a control command to at least one actuator of an electrohydraulic machine according to an embodiment.

In FIG. 1, a block diagram illustrating a control unit 20 of the present invention in an electro-hydraulic machine 1 (only schematically indicated) is shown. A control unit 20 for use in an electrohydraulic machine can be electrically coupled with, and configured to receive inputs I from a user interface 10. The control unit 20 can also be electrically coupled with an actuating unit 30. Hydraulic cylinders 304a, 304b can be operated through one or more electro-hydraulic valve assemblies 302a, 302b.

The control unit 20 may send control commands C to the electro-hydraulic valve assemblies 302a, 302b, which in turn actuate the hydraulic cylinders 304a, 304b by regulating the hydraulic flow to the cylinders, which control the position and movement of a working tool unit 40, here exemplarily shown as a shovel 41. Numerous different implements or working tools 40 may be attachable to the machine and controllable via the user interface 10. The implements or working tools 40 may include any other device used to perform a particular task such as, for example, a bucket, a fork, a blade, a ripper, a dump bed, a broom, a snow blower, a propelling device, a cutting device, a grasping device, or any other task-performing device known in the art.

The electro-hydraulic valve assembly 302a may be triggered and activating the hydraulic cylinders 304a for moving the shovel 41 in horizontal direction. The hydraulic cylinder 304a may be triggered and activating the hydraulic cylinder 304b for moving the shovel 41 in vertical direction. Further actuators and valves can be provided to increase the movement range of the working tools. The working tools 40 may be configured to pivot, rotate, slide, swing, lift, or move relative to the machine (not shown) in any manner known in the art.

The control unit 20 comprises a monitoring unit 202 configured for receiving and monitoring an input signal of the user interface 10, and a determination unit 204 configured for determining if the monitored input signal is related to a non-user induced input or a user induced input, and a control command generating unit 206 for generating a control command to an actuating unit 30 upon processing the input signal I in dependence on whether the input signal I is a user-induced input or a non-user-induced input. The determination unit 204 may also be called a shake detection unit.

A non-user induced input may be an unintended input from an user (also called operator) such as that of an overshooting of the user interface which may be caused by a spring-loaded joystick 100 when the user releases the joystick from an (intended) large displacement which leads to an oscillating movement of the joystick 100.

For example, depending on the design of the joystick 100 it may overshoot the center position when being released from a large displacement due to the spring-loading of the joystick 100 coupled with its inertia. In other words, the joystick is, when being released from a large displacement, accelerated in a first movement direction towards its neutral position by means of the spring-loading and will overshoot the neutral position due to its inertia. From the overshot position it will be accelerated towards its neutral position again (roughly in the opposite movement direction to the first movement direction) and will overshoot again. This oscillation is repeated and is only damped by internal friction or intentional (mechanical) damping means in the joystick.

This overshooting of the joystick 100 can cause unintended implement functions being commanded. The quick change in direction of a function from being held in one direction to overshooting in the other direction can cause the machine to shake. As the joystick 100 is not being held by the user anymore the shaking of the machine may cause the joystick 100 in turn to also shake. In certain situations this joystick 100 shake may be enough to command the implements again. In other words, in addition to the oscillation of the joystick 100 effected by the spring-loading, the shaking of the machine may put additional oscillation energy into the joystick 100 such that the oscillation of the joystick 100 may be prolonged, may continue or even may be enforced such that the joystick 100 ends up with maximum displacement.

This cycle can continue such that the joystick oscillating movement induced by a non-user induced input shakes the machine resulting in machine shaking which induces again the joystick 100 to oscillate and so on. This cycle may stop until either the implements move into a range where the feedback is damped out or if the user intervenes and stops the joystick oscillating movement (also called shaking). This can become extremely violent and damaging to the machine. For example, fatigue or distraction could have caused such an unintended input.

A safe operation of the electro-hydraulic machine is thus ensured by the determination of whether the input is a non-user induced input, in particular a non-user induced oscillation movement of the user interface, and consequently generating dedicated control commands to the actuators. The control command for the non-user induced input is damped in comparison to the user-induced input as will be explained in more detail in FIGS. 2 and 3:

A user induced input is—in contrast to the non-user induced input—an input from an operator indicative of a desired movement of the machine including the working tools 40. In other words, the user moves the user interface, e.g. the joystick 100, in order to achieve an intended command to the machine or the working tools.

The user interface 10 may be a multi-axis joystick 100. The joystick 100 may be a proportional-type controller configured to position and/or orient the implements or working tools 40 and to produce an input signal indicative of a desired movement of the implement in the working tool 40. The joystick 100 may be configured to deliver input signals I to the control unit 20 to extend or retract the hydraulic cylinder 304a, for example when the joystick 100 is moved left or right. The joystick 100 may also be configured to deliver inputs to the control unit 20 to extend or retract the hydraulic cylinder 304b, for example when the joystick 100 is moved up or down. Thus, movement of the joystick 100 may cause a change in position of the shovel 41 through the control unit 20 and the electro-hydraulic valve assemblies 302a, 302b and extension or retraction of the hydraulic cylinders 304a, 304b.

Preferably, the determination unit 204 may be a functional entity of the control unit 20, but may also be provided as a structural component, i.e. being provided separately from other components of the control unit 20. As can be gathered from FIG. 1, the determination unit 204 receives the input signal I from the user interface via the monitoring unit 204 and based thereupon determines whether the input signal is a non-user induced input or a user-induced input.

The control command generating unit 206 may also be a functional entity of the control unit 20, but may also be provided as a structural component.

The command generating unit generates the control command C to the actuating unit 30, respectively to at least one valve by generating a current command C in in dependence of the input signal I.

The determination unit 204 is configured to determine the non-user-induced input by detecting whether the input signal I has a motion pattern that is unusual compared to a user induced input, wherein the input signal is analyzed in terms of frequency and/or velocity and/or uniformity of deflection. For example, quick direction changes or acceleration of the joystick which are not usual for joystick movement by the operator can be detected and therefore interpreted as being inputs which were not induced by the user. Typical values for joystick movements in terms of frequency, velocity, time duration of a joystick direction change, uniformity of deflection of the joystick can be stored in a memory unit (not shown) in the control unit and compared with the actual monitored input signals.

If the input signal is determined being a non-user induced input signal the determination unit transmits a signal to the control command generating unit 206.

Figure 1A:
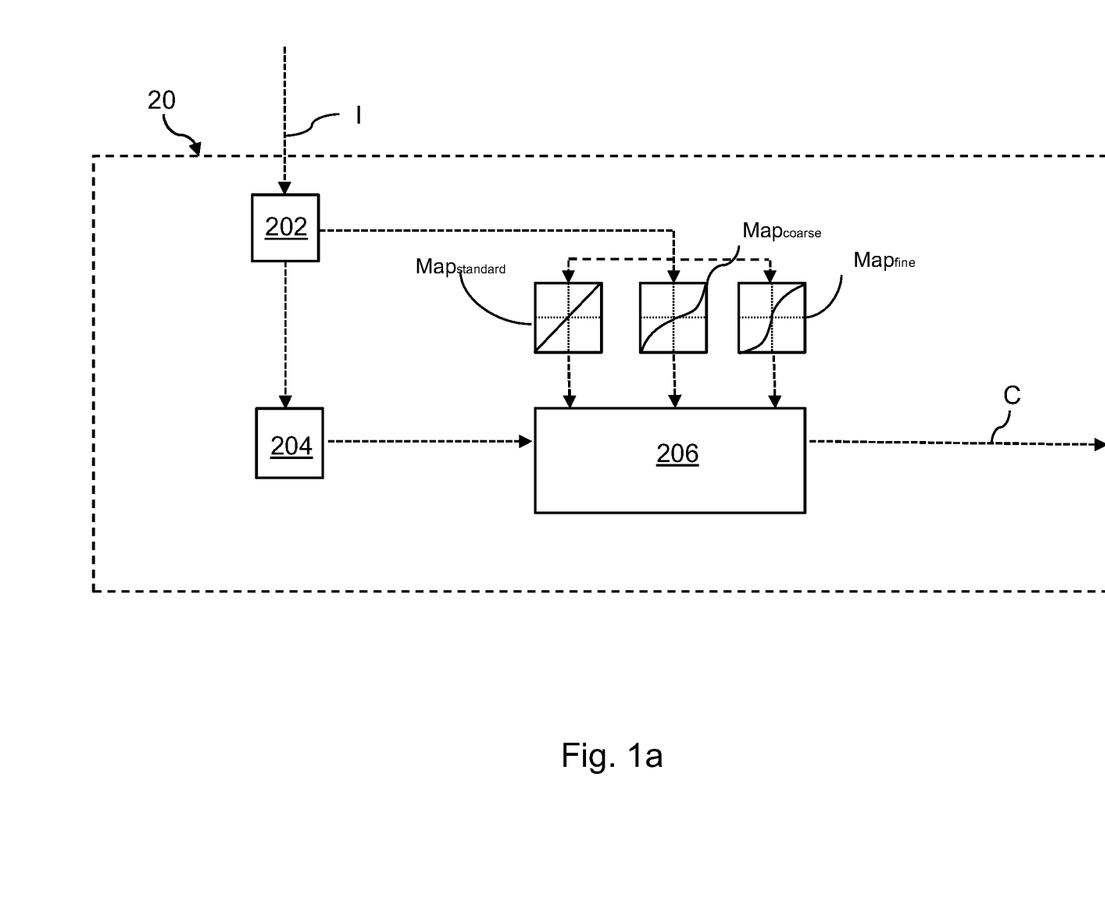
FIG. 1*a* schematically shows a block diagram of the control unit according to an embodiment.

Referring to FIG. 1 and FIG. 1a, the control command generating unit 206 receives the actual input signal from the monitoring unit 202 and a signal from the determination unit 204 indicating that the input the actual signal is a user-induced input or a non-user induced input.

If the determination unit 204 signals that the input signal is a user induced input signal the generating unit 206 commands control to the actuating unit 30 in a normal mode. If the determination unit 204 signals that the input signal is a non-user induced input signal the control command generating unit 206 commands controls to the actuating unit 30 in a damped mode. The control command generating unit 206 may be a switch, which transmits control commands C in dependence whether the input is a user induced input or a non-user induced input.

In the normal mode the input signals are transferred into output control commands according to predefined schemes, also called modulation maps. These maps predefine the relationship between an input signal I and a control command I, as shown in FIG. 1a. There might be operations which have to be operated with a different level of accuracy or precision. Therefore, several modulation maps can be stored in a memory of the control unit which set different relationship between the input signal and the control commands to the valves and/or apply different rates/response time for the valve to implement the generated control command, such that the response/reactivity of the valve is different in dependence of the selected modulation map (not shown). For example, a standard modulation map $Map_{standard}$ may define a linear relationship between the input signal and the output signal. Further, a coarse modulation map $Map_{coarse}$ may define a non-linear relationship between the input signal and the control command such that larger joystick movements are required to trigger control commands for the valve. This might be useful for operations which require less precision. Additionally, a fine modulation map $Map_{fine}$ may define a non-linear relationship between the input signal and the control command such that already smaller joystick movements are sufficient to trigger control commands to the valve. This modulation map may be selected for operations which require more precision and thus already small movements of the joystick may trigger a control commands to the valves. Thus, the maps differ in applying different modes of reactivity of the valves in response to the input signal. The operator may select the modulation map according to the operations to be performed in the normal mode. For example, the operator may select the different modulation maps by a dedicated switch in a user interface panel or arranged on the joystick itself. The modulation maps may be configured during machine setting.

When the damped mode is selected, this may then modify or override the characteristics of the normal mode as will be shown in the following.

Figure 2:
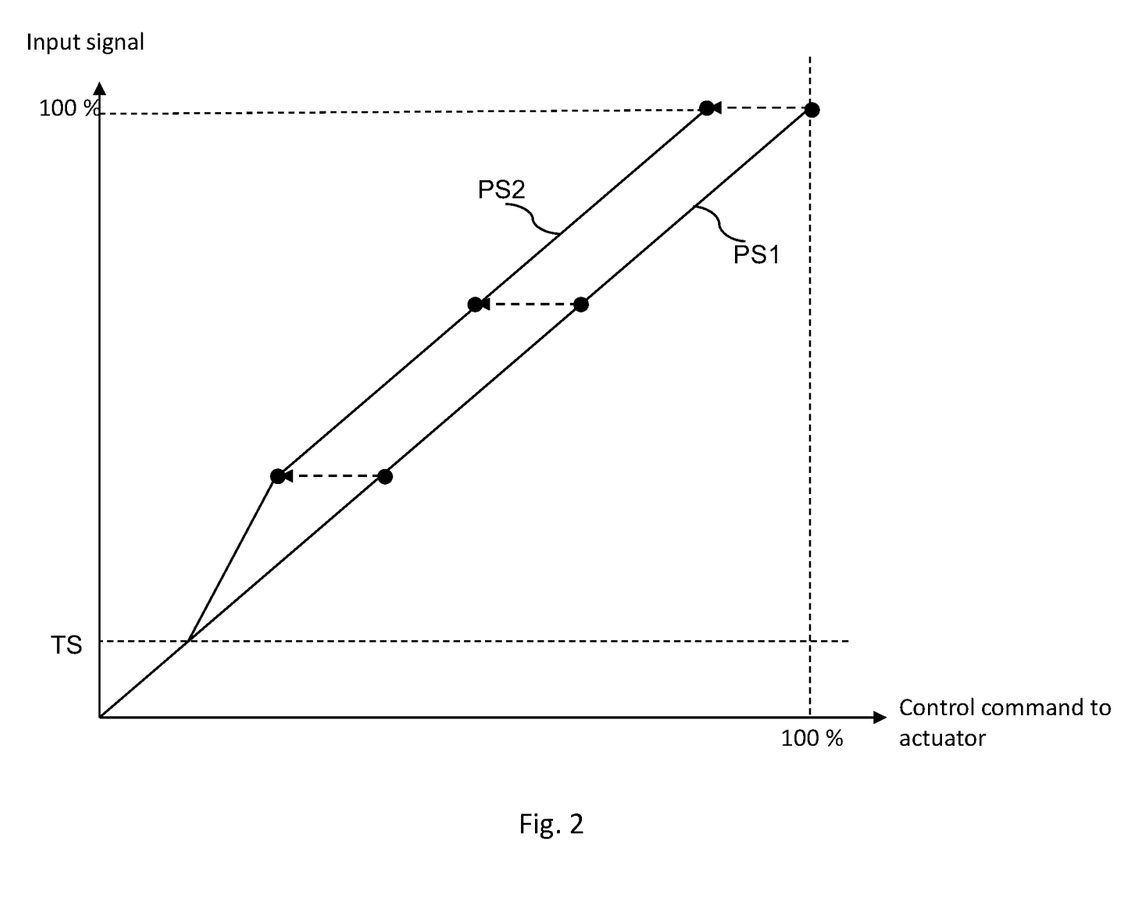
FIG. 2 shows a control command of a first processing scheme for a user-induced input and a second processing scheme for a non-user induced input, wherein a control command of the second processing scheme is reduced by a constant value in comparison to the control command of the first processing scheme.
Figure 3:
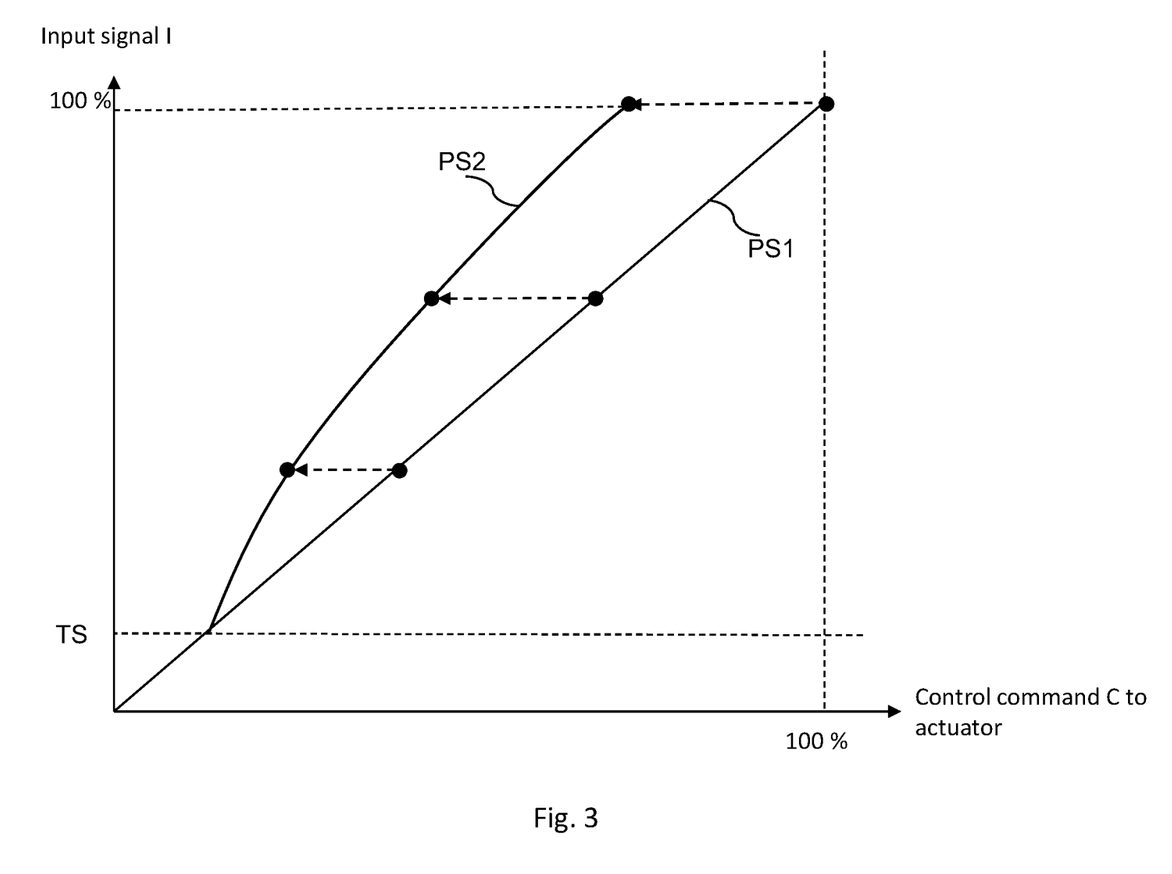
FIG. 3 shows a control command of a first processing scheme for a user-induced input and a second processing scheme for a non-user induced input, wherein a control command of the second processing scheme is reduced by a variable value in comparison to the control command of the first processing scheme.

According to an embodiment, and referring to FIG. 2 and FIG. 3, the generation of the control command C may be performed such that the input signal I is processed according to a first processing scheme PS1, i.e. according to the normal mode which may apply one of the above described modulation maps, e.g. the standard modulation map, when the input signal is a user-induced input. The input signal I is processed according to a second processing scheme PS2, i.e. the damped mode, when the input signal is a non-user-induced input, and wherein the first and the second processing scheme employ different relations between the received input signal and the control command to the actuator. Thus, if the determination unit 204 detects that an input signal is not induced by a user the control command generating unit 206 receives a signal to damp the control command to the actuators.

According to an embodiment, the second processing scheme PS2 generates a modified control command in comparison to the first processing scheme PS1, such that a limited magnitude of the control command is generated in comparison to the first processing scheme PS1. Thus, the command generating unit 206 can generate the control command for the non-user induced input by modifying the control commands in an existing modulation map of the normal mode, e.g. the standard modulation map, such that the current command to the valve is damped. The same applies when the normal mode applied the coarse modulation map or the fine modulation map.

Referring to FIG. 2 and FIG. 3, the processing scheme PS1 and the processing scheme PS2 is shown. PS1 represents the relationship between the input signal and the control command in the normal mode (e.g. standard modulation map), i.e. for a user induce input signal. PS1 represents the relationship between the input signal and the control command in the damped mode, i.e. for a user induced input signal. For example, for the same input signal in positive direction and movement of the joystick to the right in horizontal direction the control command outputted to the actuators differs. As shown in FIG. 2 the modified control command of the second processing scheme PS2 may be reduced predominantly by a constant value in comparison to the control command of the first processing scheme PS1. In other words, the control command generated by applying processing scheme PS2 is damped by a constant factor in comparison to a control command based on processing scheme PS1. The damped mode may be active when the joystick has crossed a predetermined threshold TS, i.e. only after a certain deflection the damping mode is activated.

Referring to FIG. 3, the modified control command of the second processing scheme PS2 is reduced in a variable manner in comparison to the control command of the first processing scheme PS1 in dependence of the value of the input signal, e.g. the deflection of the joystick. As shown, the stronger the signal or the deflection of the joystick, the more the control command is reduced or damped.

Alternatively the control command generating unit 206 may override the current selected modulation map and apply a dedicated modulation map for the damped mode. Thus, the dedicated modulation map is activated when the determination unit 204 detects a non-user induced input, in particular a non-user induced oscillating movement.

For example, for an input signal of 100% which would generate a control command of 50% in the normal mode, the control command in the damped mode is limited to 30%. Thus, the ratio between input signal and control command is modified in dependence whether the valves are triggered in the normal mode or in the damped mode.

Figure 4:
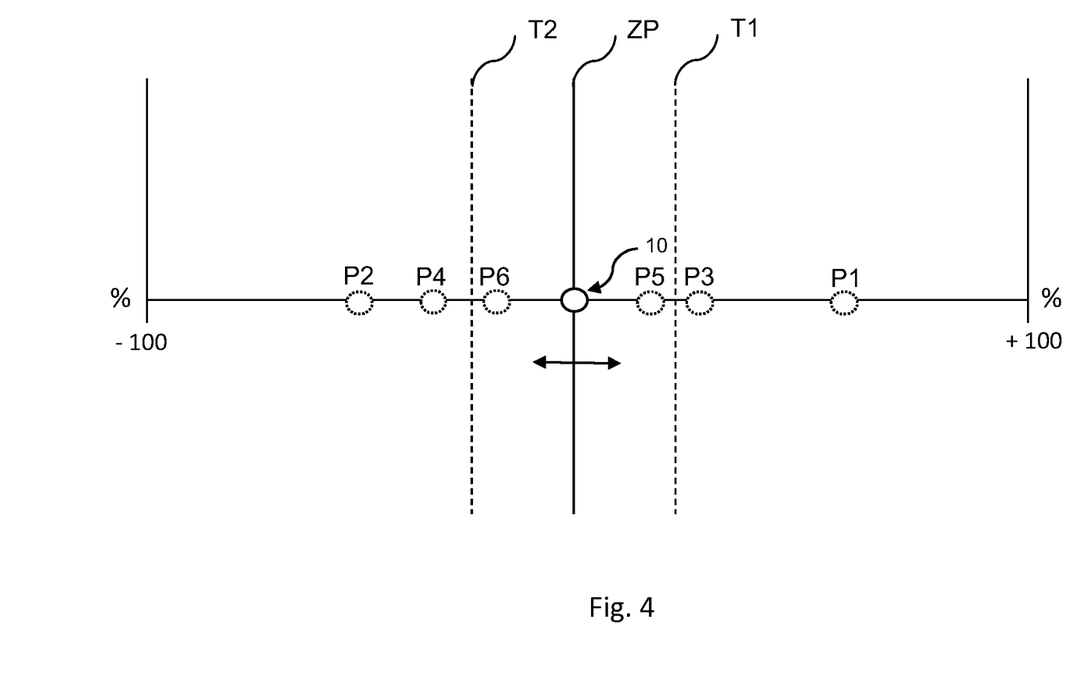
FIG. 4 shows a motion pattern of a non-user induced input of a user interface according to an embodiment.

Referring to FIG. 4, an exemplary motion pattern of a non-user induced input of a user interface 10 according to an embodiment is shown. In particular, an oscillating movement of the user interface, in particular a joystick lever is shown. The motion of the joystick lever shown here is exemplary for a movement in horizontal direction of the joystick. But the same principle applies to movement patterns in the vertical direction or other directions.

As shown exemplarily, the input signal I is controllable in a range of +/−0 to 100% in relation to a zero position ZP, wherein a positive value represents a motion of the input signal in one direction and a negative value represents a motion of the input signal in the opposite direction.

As shown exemplarily here, a user interface, e.g. a joystick, shows a motion pattern that starting from the zero point (bold line) oscillates from right to left (dotted lines). As shown exemplarily a joystick is largely displaced to position P1 and then released. The joystick may be spring-loaded and may cause the joystick to overshoot the ZP and switching to position P2 and in the following moving back and forth to positions P3, P4, P5, P6 and so on. In case these joystick inputs are commanded to the actuating unit 30 in the normal mode, this may cause a shaking of the machine which cause a further movement of the joystick leading to further shaking of the machine. The present invention improves the detection of in particular oscillating movements caused by non-user induced inputs and its efficient stopping or damping such that a shaking of the machine that causes the joystick to shake further does not occur.

As described above, provided control unit 20 is configured to detect such an oscillating movement caused by the non-user induced input and in response to dampen such an oscillating movement by modifying the control commands such that a magnitude of currents commands is transmitted to the valves. Alternatively, control commands can be set to zero closing the valves completely. Thus, upon receipt of an input from the joystick 100 which is determined being not in the typical range of oscillating movements of a user, thus based on a non-user induced input, the control unit 20 prevents the operation of the actuating unit 30 according to the first processing scheme PS1, i.e. the normal mode. Thus, the control unit 20 switches to the second processing scheme PS2, i.e. the damped mode.

According to a preferred embodiment, the determination of the non-user-induced input is performed by detecting an oscillating movement of the user interface due to a non-user induced input, determining whether the input signal crosses at least two predetermined thresholds T1, T2 a predetermined number of times in a predetermined time period. For example, value ranges of typical oscillating moments of the joystick around the ZP are stored in a memory. Such typical oscillating movement can occur by specific operations of the machine. For example, after completing a task an operator may desire to dislodge dirt, mud, clay, or debris from the implement. To do so, the operator may quickly cycle a control lever back and forth, causing the hydraulic actuators to expand and retract, thereby moving the implement back and forth in rapid succession. If the monitored input values form the user interface values differ from stored oscillating values such as for dirt dislodging operations, the control unit detects that the oscillating movement is caused by a non-user induced input.

If such an untypical movement of the joystick is detected the control command generating unit 206 is configured to switch to processing scheme PS2 in order to limit the current command to the valves. This is performed until the non-user induced inputs lie within the predetermined thresholds again.

The at least two predetermined thresholds T1, T2 may face to each other with respect to the zero position ZP of the user interface 10.

According to the example shown herein at least two predetermined thresholds are defined for monitoring the motion of the input signal in horizontal direction. Further, at least two predetermined thresholds may be defined for monitoring the motion of the operator input device in vertical direction.

The predetermined thresholds T1, T2 may be placed in the range of +/−5% or +/−10% or +/−20% in relation to the input signal, i.e. the maximum value of +/−100%, and the zero position ZP of the user interface 10.

According to an embodiment, the determination the non-user-induced input may be further performed by detecting if a hand of a user is in contact with the user interface 10. In an example, a contact sensor may be provided at the joystick to detect whether an input is user induced or not.

The control unit 20 may be microprocessor-based, i.e. computer-based.

For example, the control unit 20 may be an electronic control module (ECM) that performs a number of machine functions and may include software to specifically perform work associated with the present invention.

Figure 5:
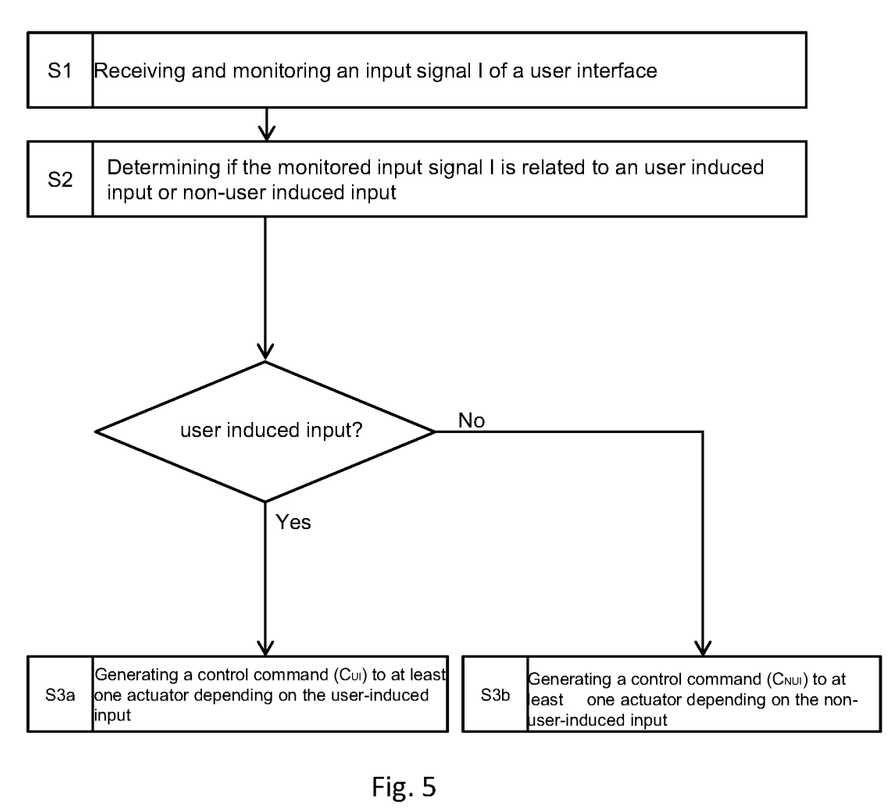
FIG. 5 shows a flow diagram depicting a method according to an embodiment to be performed by the control unit shown in FIG. 1.

Referring to FIG. 5, a flow diagram is shown illustrating a method for generating a control command to at least one actuator of an electrohydraulic machine. In S1 an input signal I provided by a user interface may be received and monitored. Further, in step S2, it is determined whether the monitored input signal I is related to a user-induced input or a non-user-induced input. In step S3, a control command C upon processing the input signal in dependence on whether the input signal is a user-induced input or a non-user-induced input is generated.

As shown in FIG. 5, a control command $C_{UI}$ is generated to at least one actuator depending on the user-induced input when a user induced input has been determined (S3a). If a non-user induced input has been determined a control command $C_{NUI}$ is generated to the actuator.

According to a first aspect of the invention, a method for generating a control command to at least one actuator of an electrohydraulic machine, comprising the steps of receiving and monitoring an input signal I provided by a user interface, determining if the monitored input signal I is related to a user-induced input or a non-user-induced input, and generating the control command C upon processing the input signal in dependence on whether the input signal is a user-induced input or a non-user-induced input is provided. By this, a control command to an implement function of the electro-hydraulic machine is securely transmitted independently of the whether the input was intended or not. In particular, the provided method improves the detection of oscillating movements caused by non-user induced inputs and its efficient stopping or damping such that a shaking of the machine that causes the joystick to shake further does not occur.

Preferably, the step of generating the control command is performed such that the input signal I is processed according to a first processing scheme PS1, i.e. in the normal mode, when the input signal is a user-induced input and the input signal I is processed according to a second processing scheme PS2, i.e. in the damped mode when the input signal is a non-user-induced input, and wherein the first and the second processing scheme employ different relations between the received input signal and the control command being the output to the actuator.

For example, in the damped mode the generated control command resulting from a specific input signal is limited in comparison to the normal mode. In damped mode the control command is lower than in normal mode for the same input signal. In an example, in the damped mode the modulation map can be changed so that the commands are generated less directly in relation to the input signal. For example, if the machine is operated in the normal mode in the standard modulation map or in the fine modulation map, and a non-user induced input is selected, the mode is changed to the damped mode and the modulation map is changed from the standard modulation map or the fine modulation to the coarse modulation map which apply a less direct ratio between the input signal and the generated control command. In another example, a dedicated modulation map may be applied for the damped mode and selected if a non-user induced input, in particular a non-user induced oscillating movement, is detected.

By this, the valves actuating the actuators are triggered with a different ratio between the input signal and the corresponding generated control command. Accordingly, when a non-user induced input like an oscillating movement caused by the release of the spring loaded joystick is detected, processing scheme PS2 is applied in order to dampen the control command resulting from the input signal. Such that the control commands caused by a non-user induced input are attenuated or even not transmitted to the implement functions of the electro-hydraulic machine.

According to a further alternative embodiment, the modulation maps can be configured in order to apply different rates/response time for the valve to implement the generated control command, such that the response/reactivity of the valve is different in dependence of the selected modulation map. That means, the same ratio between the input signal and the generated control is applied independently whether being operated in normal mode or damped mode but the rate for actuating the valve to the generated control command is limited or increased in comparison to a standard response time, e.g. in the standard rate set in the standard modulation map. In the damped mode, the time for the valve to implement the generated control command increased, such that the response/or reactivity of the valve is slowed down and the input signal is damped.

For example, in the damped mode the response time of the generated control command resulting from a specific input signal is increased in comparison to the normal mode. In the damped mode, the value for the control command is the same but the time for setting the valve to the generated control command is increased which result in damping the generated control command in comparison to normal mode. In an example, in the damped mode the modulation map can be changed so that the commands are generated less directly in relation to the input signal. For example, if the machine is operated in the normal mode in the standard modulation map or in the fine modulation map, and a non-user induced input is selected, the mode is changed to the damped mode and the modulation map is changed from the standard modulation map or the fine modulation to the coarse modulation map which apply an increased response time for the valve to implement the generated control command. In another example, a dedicated modulation map may be applied for the damped mode and selected if a non-user induced input, in particular a non-user induced oscillating movement, is detected.

Preferably, a combination of both embodiments is applied, i.e. changing, in relation to the normal mode, the ratio between the input signal and the generated control command, and changing, in relation to the normal mode, the rate for actuating the valve to the generated control command when a non-user induced input is detected and the damped mode is selected.

According to an embodiment, the step of determining the non-user-induced input is performed by detecting whether the input signal has a motion pattern that is unusual compared to a user induced input.

Further, the motion pattern of the input signal may be analyzed in terms of frequency and/or velocity and/or uniformity of deflection.

Preferably, the step of determining the non-user-induced input is performed by detecting an oscillating movement of the user interface due to a non-user induced input, determining whether the input signal crosses at least two predetermined thresholds T1, T2 a predetermined number of times in a predetermined time period.

This enable an efficient and simple distinction between a user induced input and a non-user induced input.

According to an embodiment, the at least two predetermined thresholds T1, T2 may face to each other with respect to the zero position ZP of the user interface. This can be mirror symmetrical or also implemented in other arrangements. By this, it can be detected in an efficient and simple manner whether an oscillating movement of the joystick crosses the predetermined thresholds a predetermined number of times in a predetermined time duration.

According to an embodiment, at least two predetermined thresholds are defined for monitoring the motion of the input signal in horizontal direction, and/or at least two predetermined thresholds are defined for monitoring the motion of the operator input device in vertical direction. This allows non-uses induced inputs to be detected in several degrees of freedom. This ensures a safe operation of the electro-hydraulic machine.

According to an embodiment, the predetermined thresholds T1, T2 are placed in the range of +/−5% or +1-10% or +/−20% in relation to the input signal and the zero position ZP of the user interface. The adjustment of the range determines the displacements of the user interface at which the input signals are damped, i.e. when the control commands are operated in the damped mode. The ranges can be adjusted depending on the type of electro-hydraulic machine. For example, an electro-hydraulic machine that is exposed to more severe hazards due to its field of application, e.g. carrying heavy loads or its dimension (e.g. height) and the resulting higher center of gravity, can be set with a smaller range (e.g. +/−5%) compared to less vulnerable machines, e.g. machines of smaller dimensions, which are then set with grater ranges (e.g. +/−10 or +/−20%). This allows many different types of electro-hydraulic machines to be flexibly equipped with the provided method and a control unit for generating a control command to at least one actuator of an electrohydraulic machine.

According to an embodiment, the second processing scheme PS2 generates a modified control command in comparison to the first processing scheme PS1, such that a limited magnitude of the control command is generated in comparison to the first processing scheme PS1.

Preferably, the modified control command of the second processing scheme PS2 is reduced by a constant value in comparison to the control command of the first processing scheme PS1.

Alternatively, the modified control command of the second processing scheme PS2 is reduced by a variable value in comparison to the control command of the first processing scheme PS1 in dependence of the value of the input signal.

This allows the degree of attenuation to be adjusted according to the magnitude of the deflection of the user interface. For example, if the user interface, in particular the joystick is heavily deflected, the factor by which the control command is reduced/damped is higher than if the user interface just exceeds the threshold values. This means that the user interface and the generated control commands triggered by the user interface can be attenuated to different degrees in case a non-user induced input is detected. This increases the safety of the operation of the electro-hydraulic machine.

According to an embodiment, the step of generating the control command for a non-user-induced input is generated until the input signal of the non-user induced input lies within the predetermined thresholds.

According to an embodiment, the step of determining the non-user-induced input is further performed by detecting if a hand of a user is in contact with the user interface. This can improve the detection of whether an oscillating movement is induced by the user or not. For example, if the sensor does not detect any contact of the hand with the user interface and the detection unit detects an oscillating movement of the user interface outside the thresholds, it is certain that a non-user induced input is present.

According to a second aspect, the control unit for use in an electrohydraulic machine system for a user interface of an electrohydraulic machine is provided. The control unit comprises a monitoring unit configured for receiving and monitoring an input signal of the user interface, and a determination unit configured for determining if the monitored input signal is related to a user-induced input or a non-user induced input, and a control command generating unit for generating a control command to an actuator upon processing the input signal in dependence on whether the input signal is a user-induced input or a non-user-induced input. By this, a control command to an implement function of the electro-hydraulic machine is securely transmitted independently of the whether the input was intended or not. In particular, the provided control unit improves the detection of oscillating movements caused by non-user induced inputs and its efficient stopping or damping such that a shaking of the machine that causes the joystick to shake further does not occur.

INDUSTRIAL APPLICABILITY

With reference to FIGS. 1 to 5, a method and a control unit 20 for generating a control command to at least one actuator of an electrohydraulic machine in an electro-hydraulic machine system 1 are suggested. The method and the control unit as mentioned above are applicable in and in connection with electro-hydraulic machine system 1, e.g. dozers, loaders, excavators, motor graders, and other types of heavy machinery. The suggested method may replace conventional methods for generating a control command to at least one actuator of an electrohydraulic machine. Accordingly, the suggested control unit 20 may replace conventional control units or may serve as a replacement or retrofit part in electro-hydraulic machine systems.

It will be obvious for a person skilled in the art that these embodiments and items only depict examples of a plurality of possibilities. Hence, the embodiments shown here should not be understood to form a limitation of these features and configurations. Any possible combination and configuration of the described features can be chosen according to the scope of the invention.

What is claimed is:

1. A method for generating a control command to at least one actuator of an electrohydraulic machine, comprising the steps of:
receiving and monitoring an input signal provided by a user interface, the user interface being a multi-axis joystick;
determining if the monitored input signal is related to a user-induced input or a non-user-induced input;
generating the control command upon processing the input signal in dependence on whether the input signal is a user-induced input or a non-user-induced input,
wherein the step of determining the non-user-induced input is performed by detecting an oscillating movement of the joystick along an axis of the multi-axis due to a non-user-induced input, determining whether the input signal crosses a first predetermined threshold located on a first side of the axis and a second predetermined threshold located on a second side of the axis a predetermined number of times in a predetermined time period, the first side of the axis and the second side of the axis are separated by a zero position of the user interface.

2. The method according to claim 1, wherein the step of generating the control command is performed such that the input signal is processed according to a first processing scheme when the input signal is a user-induced input and the input signal is processed according to a second processing scheme when the input signal is a non-user-induced input, and wherein the first and the second processing scheme employ different relations between the received input signal and the control command being the output to the actuator.

3. The method according to claim 1, wherein the input signal is controllable in a range of +/−0 to 100% in relation to the zero position, wherein a positive value represents a motion of the input signal in one direction and a negative value represents a motion of the input signal in the opposite direction.

4. The method according to claim 1, wherein the step of determining the non-user-induced input is performed by detecting whether the input signal has a motion pattern that is unusual compared to a user-induced input.

5. The method according to claim 4, wherein the motion pattern of the input signal is analyzed in terms of frequency and/or velocity and/or uniformity of deflection.

6. The method according to claim 1, wherein the first predetermined threshold and the second predetermined threshold face to each other with respect to the zero position of the user interface.

7. The method according to claim 1, wherein at least two predetermined thresholds are defined for monitoring the motion of the input signal in horizontal direction, and/or at least two predetermined thresholds are defined for monitoring the motion of the operator input device in vertical direction.

8. The method according to claim 1, wherein the predetermined thresholds are placed in the range of +/−5% or +/−10% or +/−20% in relation to the input signal and the zero position of the user interface.

9. The method according to claim 2, wherein the second processing scheme generates a modified control command in comparison to the first processing scheme, such that a limited magnitude of the control command is generated in comparison to the first processing scheme.

10. The method according to claim 9, wherein the modified control command of the second processing scheme is reduced by a constant value in comparison to the control command of the first processing scheme.

11. The method according to claim 9, wherein the modified control command of the second processing scheme is reduced by a variable value in comparison to the control command of the first processing scheme in dependence of the value of the input signal.

12. The method according to claim 1, generating the control command for a non-user-induced input until the input signal of the non-user induced input lies within the at least two predetermined thresholds.

13. The method according to claim 1, wherein the step of determining the non-user-induced input is further performed by detecting if a hand of a user is in contact with the user interface.

14. A control unit for use in an electrohydraulic machine system for a user interface of an electrohydraulic machine, wherein the user interface being a multi-axis joystick, the control unit comprises a monitoring unit configured for receiving and monitoring an input signal of the user interface, and a determination unit configured for determining if the monitored input signal is related to a user-induced input or a non-user-induced input by detecting an oscillating movement of the joystick along a axis of the multi-axis due to a non-user-induced input and determining whether the input signal crosses a first predetermined threshold located on a first side of the axis and a second predetermined threshold located on a second side of the axis a predetermined number of times in a predetermined time period, and a control command generating unit for generating a control command to an actuator upon processing the input signal in dependence on whether the input signal is a user-induced input or a non-user-induced input, in which the first side of the axis and the second side of the axis are separated by a zero position of the user interface.

15. The method according to claim 2, wherein after receiving the control command, the actuator actuating a work tool in a normal mode when the input signal is processed according to the first processing scheme, and the actuator actuating the work tool in a damped mode when the input signal is processed according to the second processing scheme.

16. The method according to claim 1, in which the joystick is spring-loaded and upon being displaced to a first position along the axis by a non-user-induced input, the spring-loaded joystick is configured to overshoot the zero position and switch to a second position along the axis and in the following moving back to a third position along the axis.

17. The method according to claim 16, in which the first position is located on the first side of the axis past the first predetermined threshold, and the second position is located on the second side of the axis past the second predetermined threshold.

18. The method according to claim 17, in which the third position is located on the first side of the axis between the zero position and the first predetermined threshold.

* * * * *